US005750905A

United States Patent [19]

Weimer et al.

[11] Patent Number: 5,750,905

[45] Date of Patent: May 12, 1998

[54] BEVERAGE DISPENSER TAP COVER WITH POSITION SENSING SWITCH

[75] Inventors: Michael G. Weimer, Oconomowoc; David K. Wetzel; Larry D. Powers, both of Watertown, all of Wis.

[73] Assignee: Eaton Corporation, Cleveland, Ohio

[21] Appl. No.: 812,461

[22] Filed: Mar. 6, 1997

[51] Int. Cl.$^{6}$ .................................................. G01N 1/00

[52] U.S. Cl. ......................... 73/863; 73/863.01; 222/14

[58] Field of Search ................................ 73/865.8, 863, 73/863.01; 222/14, 20, 27

[56] References Cited

U.S. PATENT DOCUMENTS

| | | | |
|---|---|---|---|
| 3,812,890 | 5/1974 | Haas et al. | 141/94 |
| 4,225,057 | 9/1980 | Horn | 222/27 |
| 4,572,405 | 2/1986 | Miura | 222/14 |
| 4,905,743 | 3/1990 | Gray | 141/198 |
| 4,979,641 | 12/1990 | Turner | 222/25 |
| 5,033,644 | 7/1991 | Tentler | 73/861.54 |
| 5,040,106 | 8/1991 | Maag | 364/167 |
| 5,349,993 | 9/1994 | Casey | 141/94 |
| 5,363,989 | 11/1994 | Zeamer et al. | 222/16 |
| 5,431,302 | 7/1995 | Tulley et al. | 222/14 |
| 5,454,406 | 10/1995 | Rejret et al. | 141/1 |

*Primary Examiner*—George M. Dombroske
*Assistant Examiner*—Max H. Noori
*Attorney, Agent, or Firm*—Quarles & Brady

[57] ABSTRACT

Existing beverage dispensing taps may be retrofitted with a mechanism that provides an electrical signal which indicates when the tap is open. That mechanism includes a housing with an open bottom for placement over the tap with a lever of the tap projecting upward through an aperture in the housing. The housing is held in place over the tap by a compression bonnet the holds the operating lever on a conventional beverage tap. A switch assembly within the housing is engaged and operated by a component of the beverage tap to provide the electrical signal. The switch assembly has a unique double action actuator that tolerates different amounts of movement of the tap component. The actuator has a ring that is engaged by the tap component to operate the switch assembly and an annular flange secured to the housing. A first flexible web connects the ring to the annular flange and a button with a surface with a conductive surface is coupled to the ring by a second flexible web. When the switch is closed the conductive surface abuts a pair of contacts.

12 Claims, 2 Drawing Sheets

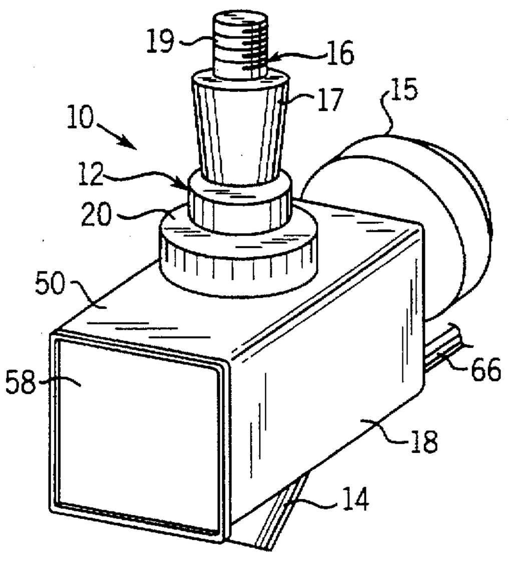
FIG. 1
FIG. 3
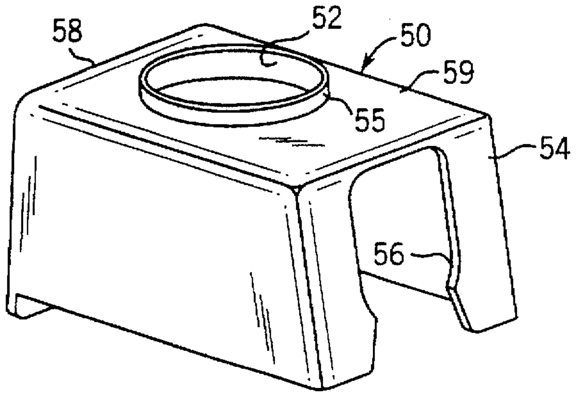
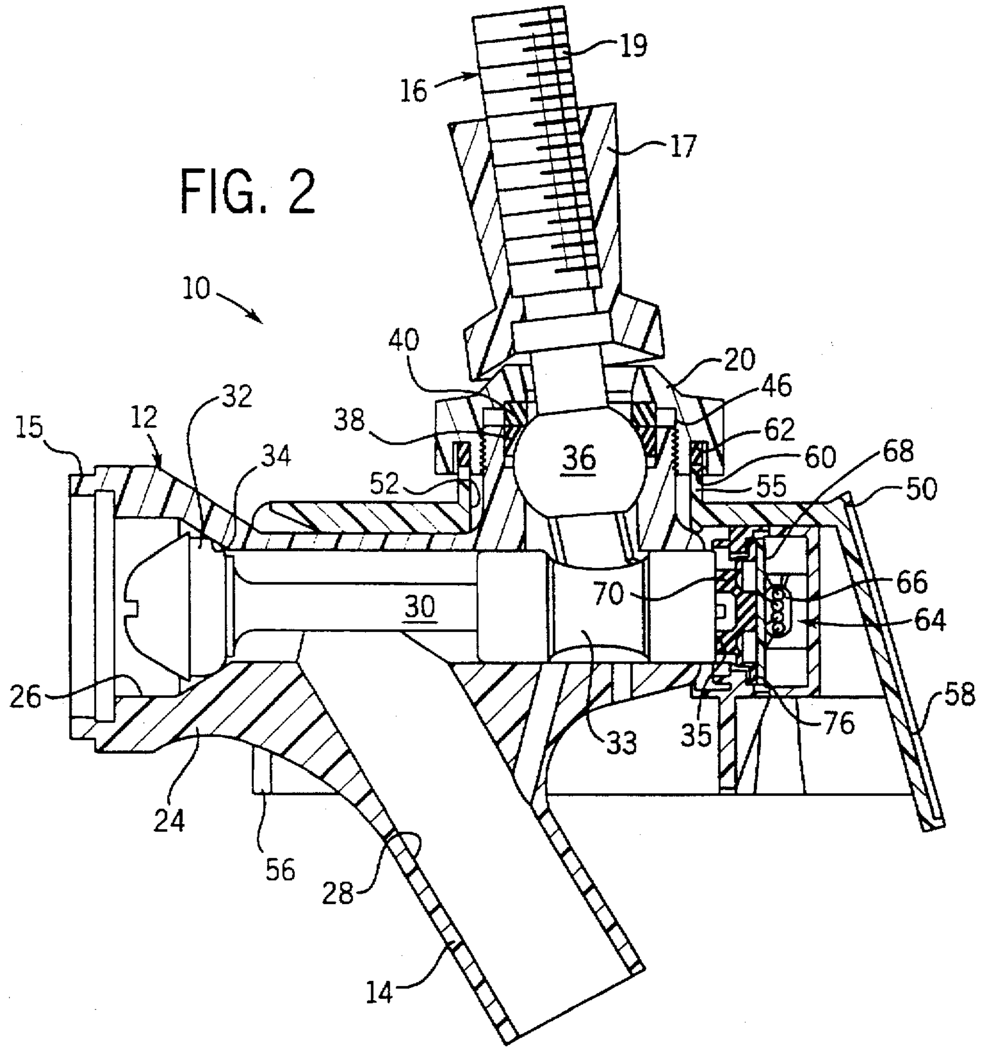
FIG. 2

FIG. 4
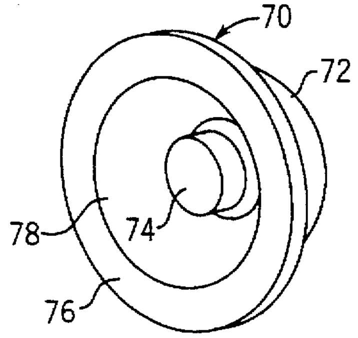
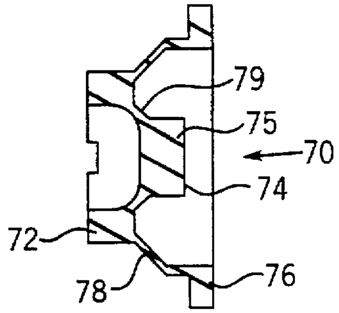
FIG. 5
FIG. 6
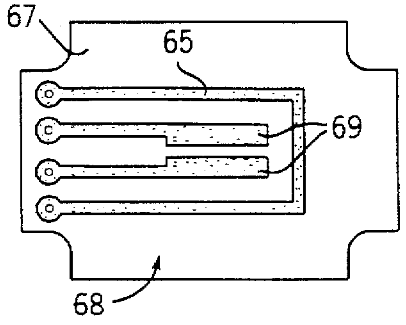
FIG. 7
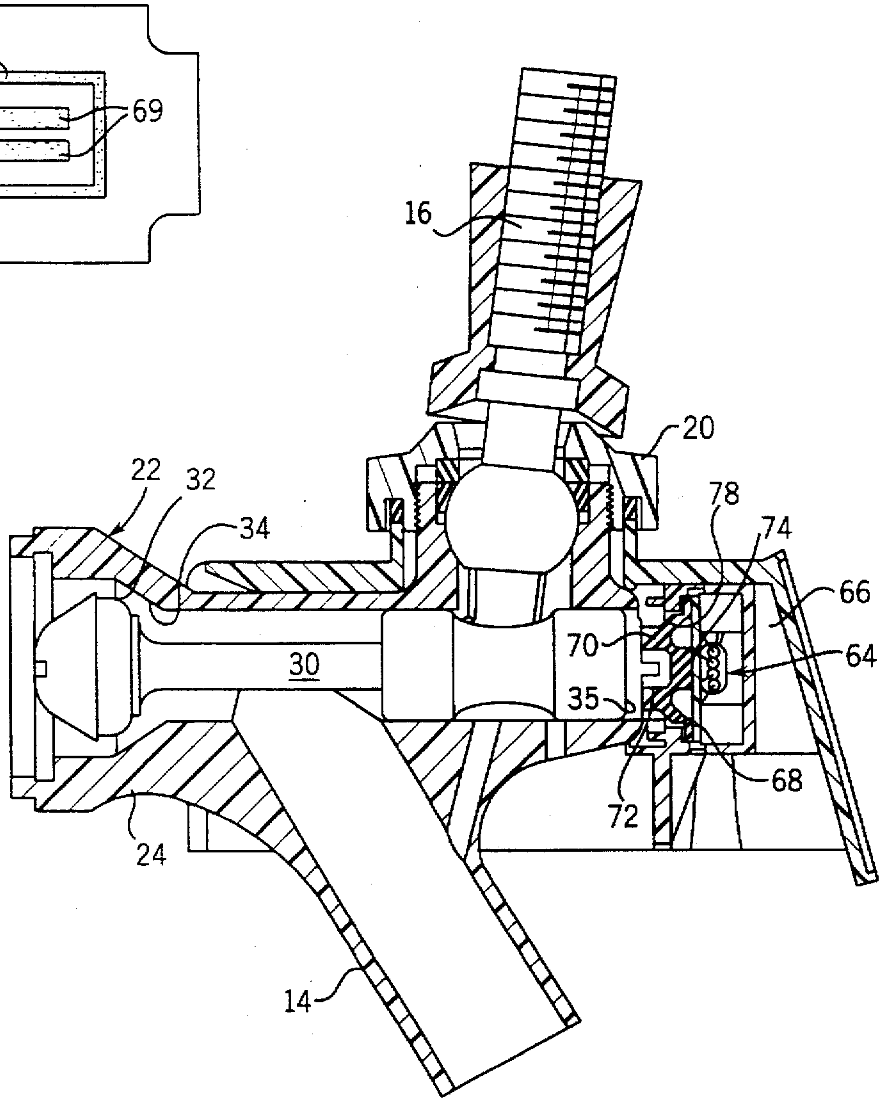

BEVERAGE DISPENSER TAP COVER WITH POSITION SENSING SWITCH

BACKGROUND OF THE INVENTION

The present invention relates manually operated beverage taps used to dispense beer and carbonated beverages; and more particularly to mechanisms for sensing when the tap is being operated by a beverage server.

Beverage taps comprise a metal spout which receives a beverage, such as beer or carbonated soda, from a supply. The tap has an internal valve controlled by a lever that is operated by the beverage server when it is desired to dispense the beverage. When the valve is in an open position the beverage flows under pressure from the supply through the tap and out of the spout into a serving container.

In many establishments which serve beverages, it is desirable to track the quantity of beverage that is dispensed in order to monitor product slippage. For example, the quantity of beverage served at a sports venue is monitored by counting the number of disposable containers that are filled. Although servers are prohibited from refilling containers for customers, a server may do so without collecting money or by pocketing the money paid by the customer. This beverage theft may go undetected, since a previously counted container was used.

Dispensing systems, such as the one described in U.S. Pat. No. 5,454,406, have been devised where a non-standard tap is controlled by a push button switch connected to a computer that operates the tap electrically when the server presses the switch. Because the beverage is dispensed from the tap at a constant rate, the computer is able to determine the quantity of beverage that is being dispensed by timing the period that the beverage flows from the spout. Thus, a determination can be made whether a significantly greater quantity of beverage has been dispensed than would be indicated by the container count. However, this system requires replacement of all the taps with ones that can be controlled by the computer; a relatively expensive procedure.

SUMMARY OF THE INVENTION

A general object of the present invention is to provide a mechanism that can be retrofitted onto an existing manually operated beverage tap to generate an electrical signal which indicates when the tap is open.

Another object is to provide such a sensing mechanism for use on existing beverage taps without modification.

A further object is to provide such a mechanism that is able to tolerate variation in the size of the beverage tap, the alignment of components and the amount of travel of the valve among different taps.

Another aspect of the present invention is to provide a technique to determine when the mechanism is disconnected as occurs if a beverage server attempts to defeat automatic monitoring.

These and other objectives are satisfied by a mechanism for sensing the operational state of a beverage tap which has a valve operated by a lever that extends through a threaded collar. A housing is adapted to be placed over the beverage tap with the spout of the tap projecting through an open bottom of the housing. The threaded tap collar extends through an aperture in the housing and a compression bonnet threads onto the collar securing the housing to the tap. The housing contains a switch assembly which is operated by an adjacent a component of the tap thereby providing an electrical signal indicative of whether the beverage tap is open or closed.

In the preferred embodiment of the sensing mechanism, the switch assembly comprises a printed circuit board having an electrically conductive pattern. An actuator, formed of resilient material with an electrically conductive surface, is pressed against the conductive pattern by the tap component when the beverage tap is in only one of an open state and a closed state. The actuator includes an annular flange contacting the housing and a member that is engaged by the component of the tap. A first flexible web is connected between the body and the annular flange. The electrically conductive surface is formed on a button that is connected to the member by a second flexible web. The first and second flexible webs act as springs which produce a relaxed state of the actuator in which the electrically conductive surface of the button is spaced from the conductive pattern of the printed circuit board.

BRIEF DESCRIPTION OF THE DRAWINGS

FIG. 1 is an isometric view of a beverage tap that has been retrofitted with a sensing mechanism according to the present invention;

FIG. 2 is a cross sectional view through the beverage tap in a closed state;

FIG. 3 is an isometric view of the housing for the sensing mechanism;

FIG. 4 is a isometric view of an actuator used in the sensing mechanism;

FIG. 5 is a cross sectional view of the actuator;

FIG. 6 is a plane view of a printed circuit board used in the sensing mechanism; and FIG. 7 is a cross sectional view through the beverage tap in an open state.

DETAILED DESCRIPTION OF THE INVENTION

With initial reference to FIG. 1, a dispenser 10 for beverages, such as beer and carbonated soda, has a manual tap 12 with a fitting 15 that is adapted to couple to a supply line through which beverage is conducted under pressure from a source, such as a keg. The tap 12 has a spout 14 through which the beverage is dispensed into a container when a server operates a lever 16 on top of the tap. A decorative handle jacket 17 is fastened around the exposed section of the lever 16 leaving an exposed threaded end 19 onto which a handle may be attached identifying the particular brand of beverage associated with the dispenser 10. A housing 18 extends over the tap 12 and is held in place by a threaded compression bonnet 20 that extends around the lever 16. As will be described, the housing cover 18 contains a mechanism that senses when the tap is open and is designed to be placed over a previously installed tap to retrofit the tap with the sensing function.

As shown in greater detail in FIG. 2, the beverage tap 12 is of conventional design having a metal body 24 with a bore 26 extending into the body 24 from the fitting 15. The bore 26 communicates with a passage 28 through the downwardly extending spout 14. Within the bore 26 is a valve stem 30 with a sealing ring 32 at one end which engages a seat 34 of the bore 26 to close the tap 12 to the flow of beverage. The end of the valve stem 30 remote from the sealing ring 32 has an annular groove 33 that is engaged by one end of the tap operating lever 16 to move the valve stem along the tap bore 26. The front end 35 of the valve stem 30 projects through an opening in the front of the tap body 24.

The lever 16 extends through an opening at the top of the tap body 24 and has a partially spherical section 36 that is received within a curved socket of that opening. The lever is captivated in the socket by a friction ring 38 and a washer 40 that are compressed against partially spherical section 36 by the compression bonnet 20 which is threaded onto a collar 46 of the tap 12 which projects upward through the housing aperture 52. This assembly of components forming the tap 12 is of a conventional design commonly found in previous installations of beverage dispensing systems.

The present mechanism, for emitting an electrical signal upon operating the tap 12, is intended to be retrofitted onto an existing beverage tap of this type that was installed previously in an establishment that serves beverages. This mechanism comprises the housing 18 formed by a hollow shell with five sides and an open bottom, as shown in detail in FIG. 3. The rear side 54 of the housing 18 has a central cutout 56 which allows the housing to slide downward over the rear portion of the tap body 24 with fitting 15 extending outside the housing. The front side 58 of the housing 18 is slanted and may include indicia for the particular type of beverage being dispensed. The top side of the housing 18 has a circular aperture 52 extending therethrough surrounded by a rim 55. When the housing is placed over the tap 12, as shown in FIG. 2, the collar 46 on the tap body 24 projects through the aperture 52.

The compression bonnet previously used on the standard tap 12 is replaced by a modified compression bonnet 20 that is illustrated. The new compression bonnet 20, in addition to compressing the friction ring 38 and washer 40 around the lever 16, has an annular groove 60 on the lower edge within which a resilient bonnet washer 62 is located. As the compression bonnet 20 is threaded onto the tap collar 46, the rim 55 around the housing aperture 52 enters the annular groove 60. With further tightening, the bonnet washer 62 engages the rim 55 forcing the top of the housing 18 against the upper surface of the tap body 24 securing the housing onto the tap body 24.

With reference to FIGS. 2 and 6, the front portion of the housing, which extends over the front of the tap body 24, contains a switch assembly 64. The switch assembly 64 includes a printed circuit board 68 from which a four conductor cable 66 leads to a computer (not shown) which monitors the operation of the tap 12. A first pair of conductors in the cable are electrically connected together by a conductive stripe 65 on one side 67 of the printed circuit board 68. That connection completes an electrical circuit which indicates to the monitoring computer that the switch assembly 64 is connected. Any attempt to disconnect the switch cable 66 from the computer will interrupt this circuit thereby providing an electrical indication to the computer that the cable is disconnected. Such disconnection may occur should a server attempt to defeat the automatic sensing of the tap operation in order to dispense drinks without depositing payment in the till.

The printed circuit board 68 has a pair of switch contacts 69 printed thereon which are connected to a second pair of conductors in cable 66. A resilient, silicone rubber actuator 70 of switch assembly 64 has a flange 76 that is held against the conductive side 67 of the printed circuit board. In this orientation, the actuator 70 is pressed against the printed circuit board 68 in a sealed manner, thereby shielding the switch contacts 69 from liquids, such as the beverage or cleaning solutions.

Referring FIGS. 4 and 5, the flange 76 of the switch actuator 70 is connected by a flexible, first annular web 78 to a ring 72. The ring 72 is coupled by a flexible, second annular web 78 to a round contact button 75 which is coaxial with both the ring and the flange 76. The flexible webs 78 and 79 of actuator 70 return to the illustrated position in a relaxed state thereby acting as springs which bias the ring 72 and button 75 away from the printed circuit board 68 in the released state of the switch assembly (see FIG. 7), while allowing the button 75 to be pushed against the printed circuit board contacts 69 when force in exerted on the actuator ring 72 by the valve stem 30. A surface 74 of the contact button 75 which faces the printed circuit board 68 is coated with a conductive ink. When the switch assembly 70 is in the closed state, this conductive surface 74 of the actuator button 75 strikes the contacts 69 on the printed circuit board 68, thereby completing an electric circuit and sending an electric current through the second pair of conductors in cable 66.

FIG. 2 illustrates the state of the beverage dispenser 10 with the tap 12 in the closed position. In this state, the front end 35 of the valve stem 30 pushes the actuator button 75 of the switch assembly 64 against the conductive surface of the printed circuit board 68 closing the circuit between the second pair of conductors in cable 66. This circuit completion generates a signal that can be sensed by the monitoring computer connected to the other end of the cable 66. Thus presence of that electrical signal indicates to the computer that the tap 12 is closed.

When the server pulls the tap lever 16 forward to open the valve as shown in FIG. 7, the sealing ring 32 of the valve stem 30 moves away from the valve seat 34 opening a passage through the tap body 24 allowing the beverage to flow into a container placed beneath the spout 14. The opening of the tap 12 causes the front end 35 of the valve stem 30 to move into the valve body 24 and away from contact with the actuator 70 of the switch assembly 64. The spring action provided by the conductive webs 78 and 79 of the actuator 70 causes the button 75 to move away from the switch contacts 69 on the printed circuit board 68. With the conductive surface 74 of the actuator button 75 spaced away from the printed circuit board 68, the circuit previously established between second pair of cable conductors is interrupted, disrupting the transmission of the signal to the monitoring computer. Interruption of the electrical signal indicates to the monitoring computer that the tap 12 has been opened.

The flexible nature of the rubber actuator 70 allows it to accommodate variation in dimensions of the tap body 24 and in travel of the valve stem 30 between the open and closed positions. Specifically with reference to FIGS. 5 and 7, the first web 78 initially flexes as the ring 72 is pressed by the valve stem 30 toward the actuator flange 76. The flexing of the first web 78 continues until the actuator contact button 75 strikes the printed circuit board 68. Thereafter, continued outward movement of the valve stem 30 against the actuator 70 produces a flexing of the second web 79 between the ring 72 and the contact button 75. This secondary flexing action enables the switch assembly to tolerate different amounts of valve stem travel so that the sensing mechanism may be retrofitted onto previously installed taps. Therefore if the valve stem of a particular tap 12 travels a greater distance forward in the closed position than other taps, the resilient actuator 70 is able to flex a greater amount and absorb the difference in travel without exerting an excessive pressure against the printed circuit board 68. Such excessive pressure could cause the printed circuit board to bend or crack.

Furthermore, the design of the sensing mechanism allows it to be easily fitted over existing beverage taps 12 without requiring the entire tap to be replaced with one specially designed for sensing the open or closed states.

Another advantage is the easy removal and reinstallation of the present tap sensing mechanism in order to clean the tap. Periodically the beverage tap 12 must be disassembled and cleaned which is facilitated by the structural design of the present mechanism. Specifically, in order to disassemble the tap 12 shown in FIG. 2, a user removes the handle and the decorative handle jacket 17 from the tap lever 16. Next the compression bonnet 20 is unscrewed from the threaded collar 46 of the tap body 24 which allows the housing 18 and internal components of the sensing mechanism to be lifted off the tap body 24. This process is reversed during reassembly.

We claim:

1. A mechanism for sensing an operational state of a beverage tap which has a spout and a valve operated by a lever that extends through a threaded collar, the mechanism comprising:

- a housing for placement over the beverage tap and having an aperture through which the threaded collar projects and an open bottom through which the spout projects when the housing is placed over the beverage tap;
- a compression bonnet which engages the housing and which has a threaded aperture to engage the threaded collar; and
- a switch assembly within the housing for operation by a component of the beverage tap and providing an electrical signal indicative of whether the beverage tap is open or closed.

2. The mechanism as recited in claim 1 wherein the tap has a body and a valve stem that moves through an opening the body as the tap is opened and closed; and the switch assembly positioned adjacent to the opening and is operated by the valve stem.

3. The mechanism as recited in claim 2 wherein the switch assembly comprises a printed circuit board having an electrically conductive pattern, and an actuator formed of resilient material with an electrically conductive surface that is pressed against the conductive pattern by the valve stem when the beverage tap is in a closed state.

4. The mechanism as recited in claim 1 wherein the switch assembly comprises a printed circuit board having an electrically conductive pattern, and an actuator formed of resilient material with an electrically conductive surface that is pressed against the conductive pattern by the component when the beverage tap is in only one of an open state and a closed state.

5. The mechanism as recited in claim 4 wherein the resilient material of the actuator silicone rubber.

6. The mechanism as recited in claim 4 wherein the switch assembly comprises:

- a cable having a plurality of wires;
- a printed circuit board having a two switch contacts connected each connected to a different wire of the cable, and having a conductive element connected to two wires of the cable; and
- an actuator formed of resilient material with an electrically conductive surface that is pressed against the two switch contacts by the component when the beverage tap is in only one of an open state and a closed state.

7. The mechanism as recited in claim 4 wherein the actuator of the switch assembly comprises:

- a member that is engaged by the component of the tap to operate the switch assembly;
- an annular flange
- a first flexible web connected between the member and the annular flange;
- a button having the electrically conductive surface; and
- a second flexible web connected between the member and the button;
- wherein the first and second flexible webs act as springs which produce a relaxed state of the actuator in which the electrically conductive surface of the button is spaced from the conductive pattern of the printed circuit board.

8. The mechanism as recited in claim 7 wherein the button has an electrically conductive coating applied thereto to form the electrically conductive surface.

9. The mechanism as recited in claim 1 wherein the housing has a rim extending outward around the aperture; and the compression bonnet has a circular edge with an annular grove within which the rim is received when the compression bonnet engages the threaded collar.

10. A mechanism for sensing whether a beverage tap is open or closed, wherein the beverage tap includes a fitting for attachment to a conduit through which a beverage is supplied, a spout, and a valve with a valve stem that is moved by a lever to open a passage from the fitting to the spout; the mechanism comprising:

- a housing having a top connected to a front side, a rear side and two lateral sides, and having with an open bottom, the rear side having an opening for the fitting to project therethrough and the top having an aperture through which the lever projects;
- a fastener for securing the housing to the beverage tap; and
- a switch assembly within the housing for operation by the valve stem to provide an electrical signal indicative of whether the beverage tap is open or closed.

11. The mechanism as recited in claim 10 wherein the switch assembly comprises:

- a printed circuit board having an electrically conductive pattern; and
- an actuator formed of resilient material with an electrically conductive surface that is pressed against the conductive pattern by the valve stem when the beverage tap is in a closed state.

12. The mechanism as recited in claim 11 wherein the actuator of the switch assembly comprises:

- a member that is engaged by the component of the tap to operate the switch assembly;
- an annular flange
- a first flexible web connecting the member to the annular flange;
- a button having the electrically conductive surface; and
- a second flexible web connecting the member to the button;
- wherein the first and second flexible webs act as springs which produce a relaxed state of the actuator in which the electrically conductive surface of the button is spaced from the conductive pattern of the printed circuit board.

* * * * *